United States Patent
Amadio

(10) Patent No.: US 11,960,650 B2
(45) Date of Patent: Apr. 16, 2024

(54) METHOD AND SYSTEM FOR PROVIDING A MUSICAL OR VOICE OR SOUND AUDIO PERCEPTION ENHANCED BY MEANS OF TACTILE STIMULI

(71) Applicant: I&G Tech sas di Amadio Giancarlo & C., Milan (IT)

(72) Inventor: Giancarlo Amadio, Milan (IT)

(73) Assignee: I&G TECH SAS DI AMADIO GIANCARLO & C., Milan (IT)

( * ) Notice: Subject to any disclaimer, the term of this patent is extended or adjusted under 35 U.S.C. 154(b) by 291 days.

(21) Appl. No.: 17/426,972

(22) PCT Filed: Feb. 11, 2020

(86) PCT No.: PCT/IB2020/051062
§ 371 (c)(1),
(2) Date: Jul. 29, 2021

(87) PCT Pub. No.: WO2020/165746
PCT Pub. Date: Aug. 20, 2020

(65) Prior Publication Data
US 2022/0155869 A1    May 19, 2022

(30) Foreign Application Priority Data

Feb. 14, 2019   (IT) .................. 102019000002171

(51) Int. Cl.
*G06F 3/01*    (2006.01)
*G10L 21/06*   (2013.01)
*H04R 3/04*    (2006.01)

(52) U.S. Cl.
CPC .............. *G06F 3/016* (2013.01); *G10L 21/06* (2013.01); *H04R 3/04* (2013.01); *H04R 2400/03* (2013.01)

(58) Field of Classification Search
CPC ........... G06F 3/016; G10L 21/06; H04R 3/04; H04R 2400/03
See application file for complete search history.

(56) References Cited

U.S. PATENT DOCUMENTS

| | | | |
|---|---|---|---|
| 8,175,302 B2 * | 5/2012 | Tanghe | H04R 3/14 381/74 |
| 9,640,047 B2 | 5/2017 | Choi et al. | |
| 2005/0036636 A1 * | 2/2005 | Noro | B06B 1/0215 381/124 |
| 2005/0132290 A1 | 6/2005 | Buchner et al. | |
| 2010/0040249 A1 | 2/2010 | Lenhardt | |

(Continued)

OTHER PUBLICATIONS

International Search Report and Written Opinion for PCT/IB2020/051062 filed Feb. 11, 2020, dated Apr. 3, 2020.

*Primary Examiner* — Andrew L Sniezek
(74) *Attorney, Agent, or Firm* — Workman Nydegger

(57) ABSTRACT

Systems and methods for providing a musical or voice or sound audio perception enhanced by means of tactile stimuli are described. A signal representative of the musical or voice or sound audio is received and tactile stimuli is simultaneously generated. The tactile stimuli (ST) is modulated on the based of the received signal to generate modulated tactile stimuli (STM). The modulated tactile stimuli are applied to a listener, together with a sound diffusion of the musical or voice or sound audio so that the listener can enjoy the musical or voice or sound audio by both auditory stimuli and tactile stimuli.

12 Claims, 4 Drawing Sheets

(56) References Cited

U.S. PATENT DOCUMENTS

2012/0224719 A1* 9/2012 Johansson ............... G08B 7/06
 381/98
2014/0161286 A1* 6/2014 Kohn ..................... H04R 25/48
 381/151
2018/0000190 A1* 1/2018 Seiler ....................... A43B 3/50

* cited by examiner

METHOD AND SYSTEM FOR PROVIDING A MUSICAL OR VOICE OR SOUND AUDIO PERCEPTION ENHANCED BY MEANS OF TACTILE STIMULI

TECHNOLOGICAL BACKGROUND OF THE INVENTION

Field of Application

The present invention regards in general the technical field of sound diffusion, with perception enhanced by means of tactile stimuli.

In particular, the invention relates to a method and a system for providing a musical or voice or sound audio perception enhanced by means of tactile stimuli, as well as a method and a system for providing a tactile fruition of musical or voice or sound audio.

Description of the Prior Art

Numerous systems and methods for improved sound diffusion with enhanced perception are known.

However, the known solutions address the technical problem of improving the quality of the sound that is perceived and, ultimately, always relate to an improvement in the perception of auditory stimuli.

Some methods and systems are known whose scope is also broadened to include other sensory stimuli, for example in systems for video games, capable of accompanying the sound and visual perception of content (for example, a video game) with tactile vibrations transferred to the user, for example by means of gloves. In such a case, the tactile perception is added to the sound and video perception, and does not enhance the sound perception as such, but simply adds a separate perceptive channel.

Considering, however, sound diffusion in the proper sense, i.e. the diffusion and/or reproduction of and/or listening to music, songs, or voice audio, there are no known solutions capable of enriching such perception by means of tactile stimuli, and there thus emerges a need to have such solutions available.

SUMMARY OF THE INVENTION

In the light of the foregoing, the object of the present invention is to provide a method for providing a musical or voice or sound audio perception enhanced by means of tactile stimuli, which makes it possible to overcome, at least partially, the drawbacks described above with reference to the prior art, and to respond to the above-mentioned needs, which are particularly felt in the technical field considered.

Said object is achieved by means of a method for providing a musical or voice or sound audio perception enhanced by means of tactile stimuli.

The subject matter of the present invention also relates to a method for providing a tactile fruition of musical or voice or sound audio.

The subject matter of the present invention further relates to a system for providing a musical or voice or sound audio perception enhanced by means of tactile stimuli.

Finally, the subject matter of the invention relates to a system for providing a tactile fruition of musical or voice or sound audi.

BRIEF DESCRIPTION OF THE DRAWINGS

Additional features and advantages of the method according to the invention will emerge from the description provided below of preferred embodiments, given by way of illustration and not by way of limitation, with reference to the annexed figures, wherein.

DETAILED DESCRIPTION

Figure 1:
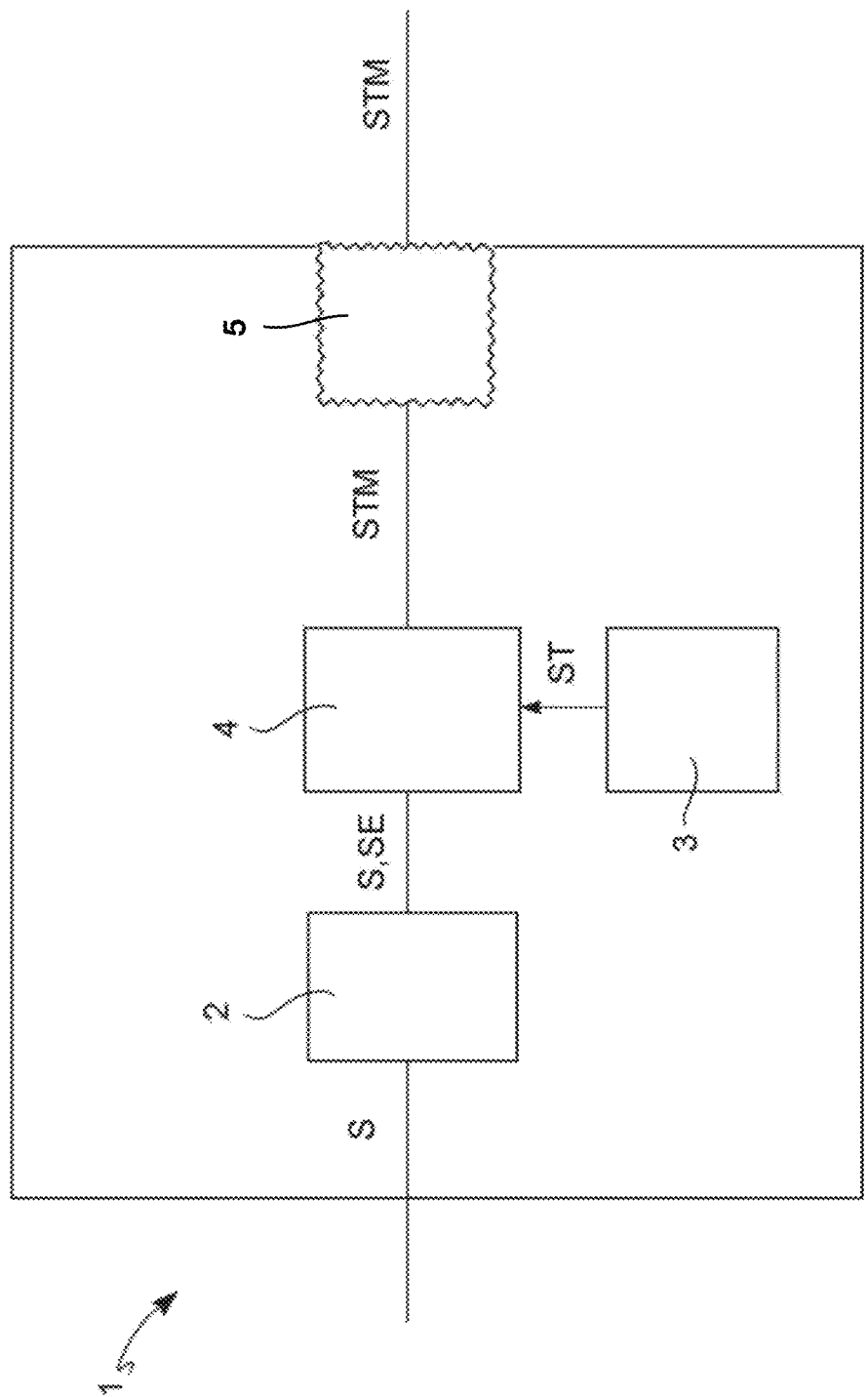
FIG. 1 illustrates a simplified block diagram of an embodiment of the system for providing a musical or voice or sound audio perception enhanced by means of tactile stimuli, according to the present invention.

The present invention, as expressed in the independent claims, considers pressure waves and acoustic vibrations generated by any audio, musical for the most part, which pressure waves and acoustic vibrations are perfectly synchronized with the original audio generated; the invention transfers the pressure waves and acoustic vibrations, through mechanical or electronic devices, to the human tactile system in order to be intercepted and perceived.

In other words, as will be described hereinbelow, every sound event is considered as a generator of an audible sound part of vibrations and pressure variations.

With reference to FIGS. 1-5, a method for providing a musical or voice or sound audio perception enhanced by means of tactile stimuli is described.

The method comprises the steps of receiving a signal (indicated as S or SE in the figures) representative of the aforesaid musical or voice or sound audio; simultaneously, generating one or more tactile stimuli ST; then modulating said one or more tactile stimuli ST on the basis of the aforesaid received signal (S or SE) to generate one or more modulated tactile stimuli STM.

The method envisages then applying the aforesaid one or more modulated tactile stimuli STM on a listener, together with a sound diffusion of the musical or voice or sound audio, so that the listener can enjoy the musical or voice or sound audio both by means of auditory stimuli and by means of tactile stimuli.

The application of the modulated tactile stimuli STM occurs together with the sound diffusion of the musical audio in the sense that the application of the modulated tactile stimuli is simultaneous or substantially simultaneous (on a time scale comparable to the times of perception by the human senses) with the sound diffusion. In this manner, in fact, the auditory stimuli and the tactile stimuli cooperate in an overall perception that is enhanced and more satisfying for the user.

The correlation between auditory stimuli and tactile stimuli is assured, in the present solution, both by the aforesaid simultaneity and the fact that the tactile stimuli are appropriately modulated in a way that is closely correlated with a signal representative of the auditory stimuli perceived by the user (as already indicated above).

The method of the present invention, in all the embodiments thereof, can be applied to situations in which the audio is of any type, but in particular (in preferred areas of application) when the musical or voice or sound audio, of which an enhanced perception is provided, comprises a human voice, articulated in words or singing, and/or a sound and/or musical composition and/or a song.

According to one embodiment of the method, the aforesaid tactile stimuli ST comprise vibrations perceptible to the touch.

In accordance with an option of implementation, the aforesaid tactile stimuli comprise mechanical vibrations; in such a case, the step of generating one or more tactile stimuli comprises generating vibrations and/or mechanical waves by means of a source of vibrations and/or mechanical waves.

In accordance with another option of implementation, the aforesaid tactile stimuli comprise pressure waves and/or acoustic vibrations; in such a case, the step of generating one or more tactile stimuli comprises generating pressure waves and/or acoustic vibrations by means of a source of pressure waves and/or acoustic vibrations.

According to one embodiment of the method, the step of applying comprises applying the vibrations generated, after having modulated them, onto one or more parts of the listener's body.

In such a case, according to one option of implementation, the step of modulating comprises modulating the one or more tactile stimuli by means of a frequency adapted to a specific part of the listener's body, and the step of applying comprises applying the vibrations generated, after having modulated them, onto said specific part of the listener's body sensitive to said frequency.

In accordance with one example of application of the method,
the specific part of the listener's body onto which the modulated vibrations are applied comprises a part of the tactile system and/or of the skeletal system and/or of the muscular system and/or of the cerebral system.

In particular, according to possible options of implementation, the specific part of the listener's body onto which the modulated vibrations are applied comprises a part of the tactile system belonging to the group comprising: Ruffini corpuscle, and/or Meissner corpuscle, and/or Pacini corpuscle, and/or Merkel corpuscle, and/or free nerve fibers adapted to detect tactile and/or pressure and/or stretching signals.

In this regard, the method offers broad flexibility in the choice of frequencies to be applied to the preselected parts of the body, according to the sensitivity of such parts of the body.

According to various options of implementation of the method, it is possible to re-modulate the auditory frequencies into optimal tactile frequencies.

For example, in the case of Pacini corpuscles the tactile frequencies can be from 100 Hz to 500 Hz. In fact, Pacini corpuscles are the most sensitive among tactile receptors, being capable of detecting a pressure on the skin in the order of one micron; the sensitivity of Pacini corpuscles is maximum for frequencies of 200 Hz but even frequencies of 500 Hz are detected.

According to another example, in the case of Merkel corpuscles the tactile frequencies can be from 5 Hz to 60 Hz. In fact, Merkel corpuscles detect pressure stimuli with a very low frequency.

According to one option of implementation of the method, a number of tactile stimuli can be simultaneously applied in different parts of the body, modulated to the respective optimal frequency.

In accordance with one embodiment, the method can be applied in the context of a sound signal diffused through electronic equipment.

In such a case, the aforesaid received signal is an electrical or electronic signal SE, coming from a receiving apparatus A, which is adapted to receive musical or voice audio transmitted in electronic form and to convert it into electrical or electronic form, thereby transforming it into what is defined above as "received electrical or electronic signal" (SE).

Furthermore, in that embodiment, the method comprises the further step of generating and diffusing an acoustic (i.e. sound) signal SA corresponding to the aforesaid musical or voice audio, so that the acoustic (sound) signal SA is perceived by the listener at the same time as the application of the aforesaid one or more modulated tactile stimuli STM.

In accordance with possible options of implementation, the aforesaid receiving apparatus A comprises a radio or a TV or a telephone or a computer or an iPod or a receiving device associated with a speaker or with an audio playback apparatus associated with the projection of video-games or movies.

In accordance with another embodiment, the method can also be applied in the context of a sound signal SS coming from an audio or sound source, and perceived directly by the listener, without the mediation of electronic apparatus.

In such a case, the step of receiving comprises detecting the sound signal SS and generating a respective electrical or electronic signal SE representative of the detected sound signal SS.

In all of the previously mentioned cases, in the method one arrives at a point in which there is an electrical or electronic signal SE representative of the sound signal diffused and perceived by the user.

According to one option of implementation, the method comprises, before the step of modulating, the additional step of processing said electrical or electronic signal SE to obtain a driving signal SP. In such a case, the step of modulating comprises modulating said one or more tactile stimuli ST by means of the driving signal SP.

It may be easily understood that the fact of having an electrical or electronic signal SE as a basis for generating the driving signal SP that modulates the tactile stimuli ST offers a wide range of possibilities, in themselves known, for processing said signal, in order to optimize, with advantageous flexibility, the timing of the tactile stimuli, so as to maximize the effect thereof.

According to several possible variant embodiments, the aforesaid step of processing the electrical or electronic signal SE comprises frequency-filtering the electrical or electronic signal, and/or translating the frequency spectrum of the electric or electronic signal around a desired central frequency, and/or varying or distorting the frequency spectrum according to a predefined law, by operating in the frequency and/or time domain.

It should be observed that, in various options of implementation of the method, the tactile stimuli are modulated in a manner which depends to some degree on sound, or are in harmony therewith, but which can be in many respects independent of the sound itself, for example as regards intensity, amplification or other aspects.

A corresponding method for providing a tactile fruition of musical or voice or sound audio, while listening to said musical or voice or sound audio, comprised in the invention, will now be described.

The method comprises the steps of receiving a signal (S or SE) representative of the aforesaid musical or voice or sound audio; then acoustically diffusing said musical or voice or sound audio; simultaneously generating one or more tactile stimuli ST, and modulating said one or more tactile stimuli ST on the basis of the aforesaid received signal so as to generate one or more modulated tactile stimuli STM.

Finally, the method envisages applying said one or more modulated tactile stimuli STM on a listener, at the same time as the step of acoustically diffusing, so as to allow the tactile fruition of the musical or voice or sound audio associated with the received signal.

A system 1 for providing a tactile fruition of musical or voice or sound audio will now be described.

The system 1 comprises receiving means 2, means for generating tactile stimuli 3, modulation means 4 and tactile stimuli application means 5.

The receiving means 2 are configured to receive a signal (S or SE) representative of the aforesaid musical or voice or sound audio.

The means for generating tactile stimuli 3 are configured to generate one or more tactile stimuli ST.

The modulation means 4 are configured to modulate the aforesaid one or more tactile stimuli ST on the basis of the received signal (S or SE) so as to generate one or more modulated tactile stimuli STM.

The tactile stimuli application means 5 are configured to apply the aforesaid one or more modulated tactile stimuli ST on a listener, so as to allow the tactile fruition of the musical or voice or sound audio associated with the received signal.

In accordance with one embodiment of the system, the means for generating tactile stimuli 3 comprise one or more vibration and/or mechanical wave generators.

According to another embodiment of the system, the means for generating tactile stimuli 3 comprise one or more vibration and/or acoustic wave generators.

In accordance with one embodiment of the system, the tactile stimuli application means 5 comprise a vibrating device 5 operatively connected to the modulation means 4 so as to receive the generated tactile stimuli ST and/or vibrations. The vibrating device 5 is configured to be placed in contact with one or more parts of the listener's body to apply said modulated tactile stimuli STM and/or vibrations.

According to several possible variant embodiments, the vibrating device 5 is made of spongy material, or another material adapted to transfer vibrations.

According to one option of implementation, the modulation means 4 comprise electronic modulators, in themselves known, which are configured to modulate an electric signal to be modulated with an electric modulating signal or an electric driving signal.

In accordance with one embodiment of the system, the modulation means 4 are configured to modulate the one or more tactile stimuli by means of a frequency adapted to a specific part of the listener's body, and the tactile stimuli application means 5 are configured to apply the generated vibrations, after having modulated them, onto said specific part of the listener's body.

According to one option of implementation, the specific part of the listener's body onto which the modulated vibrations are applied comprises a part of the tactile system and/or of the skeletal system and/or of the muscular system and/or of the cerebral system.

According to various examples of application, the specific part of the listener's body on which the modulated vibrations are applied comprises a part of the tactile system belonging to the group comprising: Ruffini corpuscle, and/or Meissner corpuscle, and/or Pacini corpuscle, and/or Merkel corpuscle, and/or free nerve fibers adapted to detect tactile and/or pressure and/or stretching signals.

In accordance with one embodiment (illustrated in FIG. 2), the system further comprises sound detection and transduction means 6, configured to detect a sound signal SS and generate a respective electrical or electronic signal SE representative of the detected sound signal SS.

In accordance with one embodiment of the system, the receiving means 2 comprise a receiving device 20 operatively connected to a receiving apparatus A, adapted to receive musical or voice audio transmitted in electronic form and to transform it into an electrical or electronic signal SE.

Figure 3:
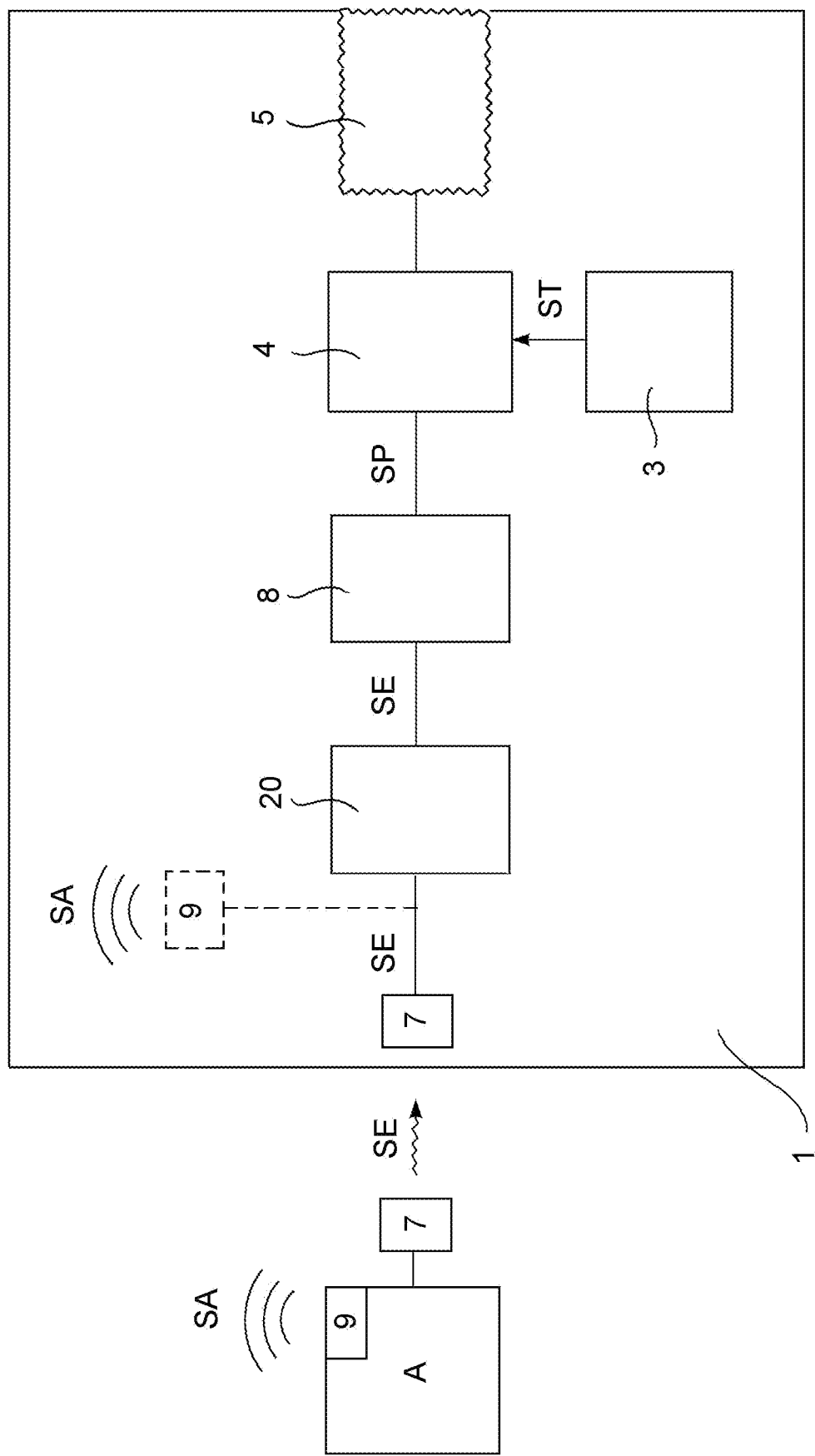

In such a case, the receiving device 20 is configured to receive the aforesaid electrical or electronic signal SE, and the system 1 further comprises sound diffusion means 9 adapted to diffuse an acoustic signal SA corresponding to said musical or voice audio. FIG. 3 illustrates first of all the option in which the sound diffusion means 9 are comprised in the receiving apparatus A, and further illustrates, by means of a broken line, the further (alternative or additional) option wherein the sound diffusion means 9 are specifically provided within the system 1, and separately from the receiving apparatus A.

According to several variant embodiments, the aforesaid receiving apparatus A comprises a radio or a TV or a telephone or a computer or an iPod or a receiving apparatus associated with a speaker or with an audio playback apparatus associated with the projection of video-games or movies.

In accordance with one embodiment, the system 1 further comprises wireless communication means 7 configured to connect the aforesaid receiving device 20 and the aforesaid receiving apparatus A.

According to one option of implementation, the aforesaid wireless communication means 7 comprise a transceiver based on short-range and/or Bluetooth and/or BLE wireless technology.

According to other options of implementation, the communication connections within the system, and in particular the connections between the receiving device 20 and the receiving apparatus A, can be made by means of cables, or by means of any other connection technology, in itself known, which is suitable for that purpose.

In accordance with one embodiment, the system 1 further comprises electronic signal processing means 8, configured to process the aforesaid electrical or electronic signal SE so as to obtain a driving signal SP.

According to various possible options of implementation, the electronic signal processing means 8 are configured to frequency-filter the electrical or electronic signal, and/or to translate the frequency spectrum of the electric or electronic signal around a desired central frequency, and/or to vary or distort the frequency spectrum according to a predefined law, by operating in the frequency and/or time domain.

According to one embodiment, the modulation means 4 comprise a modulator 4 configured to modulate the tactile stimuli by means of the driving signal.

A system for providing a musical or voice or sound audio perception enhanced by means of tactile stimuli will now be described, said system comprising a system 1 for providing a tactile fruition of musical or voice or sound audio, in accordance with any one of the above-described embodiments.

In said system 1, the sound diffusion means 9 and the tactile stimuli application means 5 are configured, respectively, to diffuse the acoustic signal SA and apply one or more modulated tactile stimuli STM on the listener in a temporally correlated manner.

According to one embodiment of said system, the sound diffusion means 9 and the tactile stimuli application means 5 are configured, respectively, to diffuse the acoustic signal and to apply one or more modulated tactile stimuli in a simultaneous manner.

With reference to the embodiments of the system, various options are possible.

For example, with reference to FIG. 1, the aforesaid receiving means 2, means for generating tactile stimuli 3, modulation means 4, and tactile stimuli application means 5 can be integrated (functionally and/or mechanically) in a single device.

Figure 2:
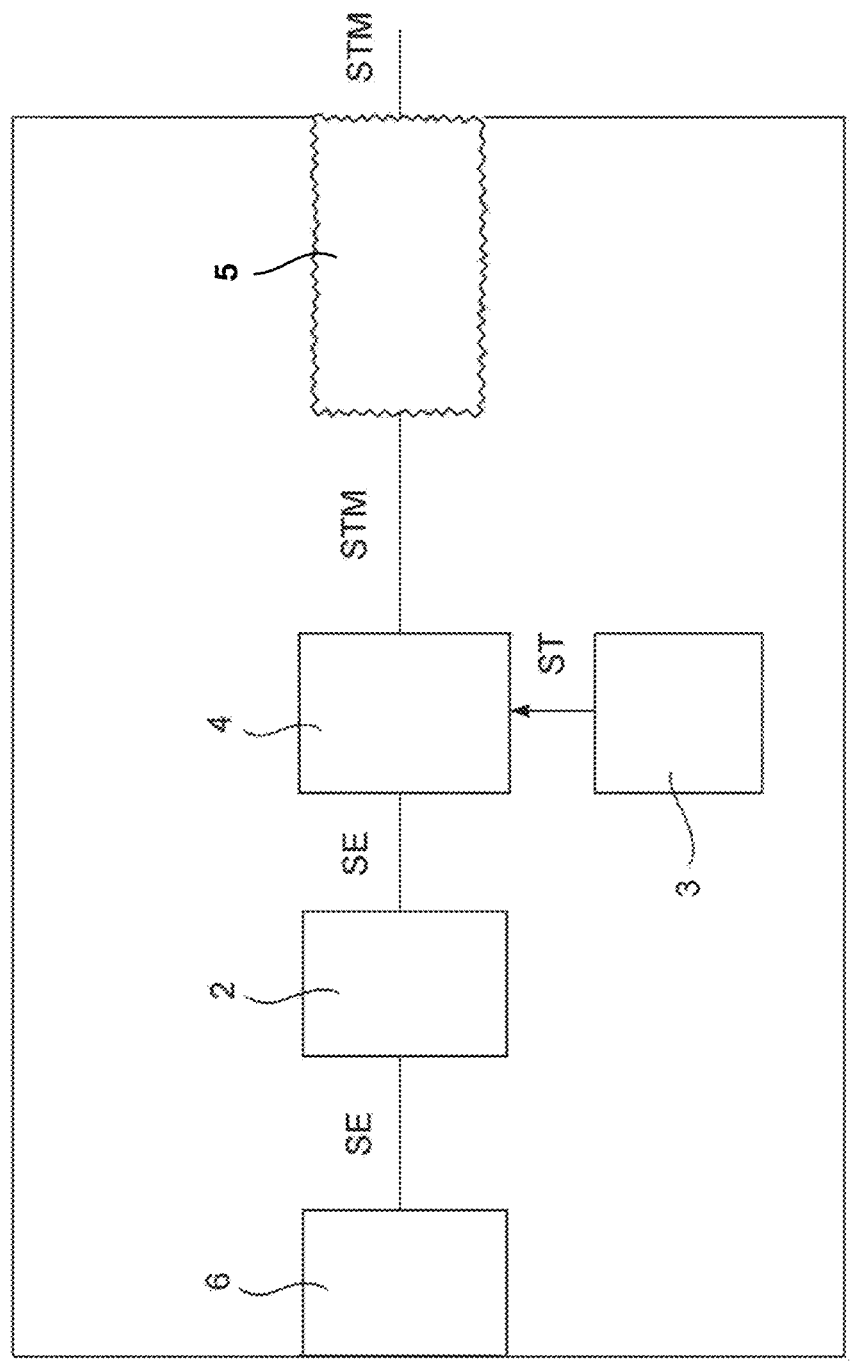
FIGS. 2 and 3 illustrate simplified block diagrams of further embodiments of said system.

Alternatively, with reference to FIG. 2, the receiving device 20, the processing means 8, the modulator 4 and the source of tactile stimuli or vibrations 3 can be integrated with one another in the form of a case 30 (similar to a small speaker case), which is then mechanically coupled to tactile stimuli application means 5 so as to provide the modulated tactile stimuli to be applied on a part of the body.

Figure 4:
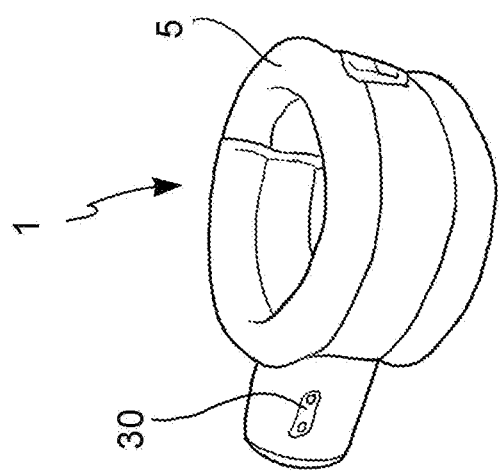
FIG. 4 illustrates an example of implementation of the system according to the invention.

The case 30 and the tactile stimuli application means 5, in the form of a ring or collar made of spongy material applicable to the listener's neck, are indicated in the example embodiment illustrated in FIG. 4.

Figure 5:
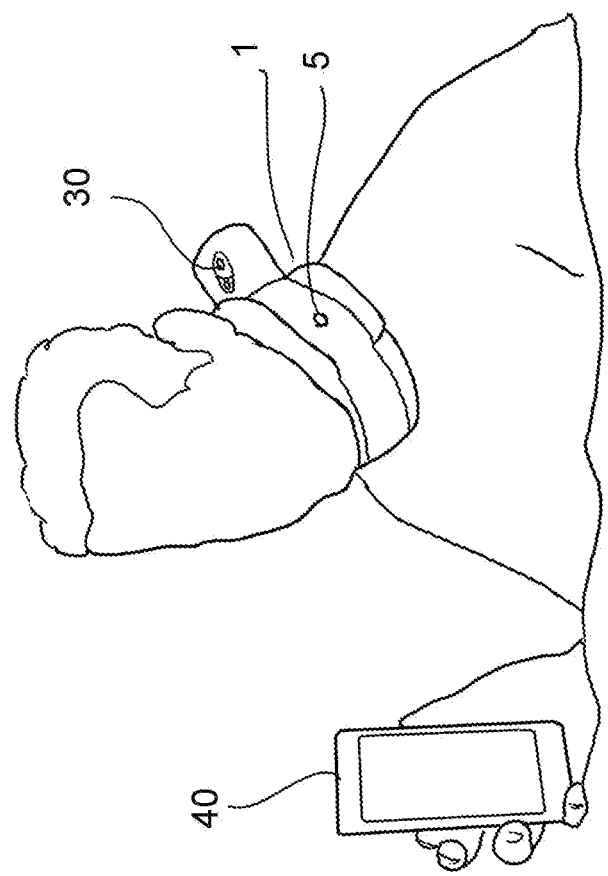
FIG. 5 illustrates another example of implementation and application of the system according to the invention.

The system 1 (case 30 and collar 5), worn on a listener's neck, while the receiving apparatus A, also provided with a wireless transmitter 7 for communication with the receiving device of the system 1, achieved by means of a mobile phone or smartphone 40, is indicated in the example application illustrated in FIG. 5.

According to a variant embodiment, not illustrated, the aforesaid connection is made via a cable.

In another option of implementation, not illustrated, the aforesaid receiving means 2, means for generating tactile stimuli 3, modulation means 4 and tactile stimuli application means 5 can be integrated (functionally and/or mechanically) in a single device, with a substantially cylindrical shape or in a conformation with a grip and an active part, consisting of a membrane or another vibrating element adapted to be placed in contact with a part of the body (for example, the forehead).

As may be observed, the object of the present invention is fully achieved by the systems and methods illustrated above, by virtue of the functional and structural features thereof.

In particular, said methods and systems allow the listener to enjoy a significantly enhanced, more gratifying perception of musical or voice or sound audio, to which the auditory stimuli and tactile stimuli generated and modulated in a manner correlated to the tactile stimuli, and suitably applied to various possible parts of the body, both contribute.

From another point of view, the above-described systems and methods make it possible to provide a tactile fruition of musical or voice or sound audio closely correlated to auditory perception.

The person skilled in the art may introduce modifications and adaptations to the embodiments of the above-described systems and methods as well as replacements of elements with other functionally equivalent ones without going beyond the scope of the following claims. Each of the features described as belonging to a possible embodiment can be achieved independently of the other described embodiments.

The invention claimed is:

1. A method for providing a musical or voice or sound audio perception enhanced by means of tactile stimuli, wherein said tactile stimuli comprise pressure waves and acoustic vibrations perfectly synchronized with said audio, comprising the steps of:

receiving a signal representative of said musical or voice or sound audio, wherein the received signal is a sound signal coming from an audio or sound source, directly perceived by the listener and wherein the step of receiving comprises:

detecting said sound signal and generating a respective electric or electronic signal representative of the detected sound signal;

generating one or more tactile stimuli by generating pressure waves and acoustic vibrations by means of a source of pressure waves and acoustic vibrations, wherein said pressure waves and acoustic vibrations are perfectly synchronized with the said audio;

modulating said one or more tactile stimuli on the basis of said electric or electronic signal to generate one or more modulated tactile stimuli;

applying said one or more modulated tactile stimuli on a listener, together with a sound diffusion of the musical or voice or sound audio, so that the listener can enjoy the musical or voice or sound audio both by means of auditory stimuli and by means of tactile stimuli.

2. A method according to claim 1, wherein said tactile stimuli comprise vibrations perceivable to the touch.

3. A method according to claim 2, wherein said tactile stimuli comprise mechanical vibrations, and wherein the step of generating one or more tactile stimuli comprises generating vibrations and/or mechanical waves by means of a source of vibrations and/or mechanical waves.

4. A method according to claim 3, wherein the step of applying comprises applying the generated vibrations, after having modulated them, onto one or more parts of the listener's body.

5. A method according to claim 4, wherein the step of modulating comprises modulating one or more tactile stimuli by means of a frequency adapted to a specific part of the listener's body, and the step of applying comprises applying the generated vibrations, after having modulated them, onto said specific part of the listener's body sensitive to said frequency.

6. A method according to claim 5, wherein the specific part of the listener's body onto which the modulated vibrations are applied comprises a part of the tactile system and/or of the skeletal system and/or of the muscular system and/or of the cerebral system.

7. A method according to claim 6, wherein the specific part of the listener's body on which the modulated vibrations are applied comprises a part of the tactile system belonging to the group comprising:

Ruffini corpuscle, and/or Meissner corpuscle, and/or Pacini corpuscle, and/or Merkel corpuscle, and/or free nerve fibers adapted to detect tactile and/or pressure and/or stretching signals.

8. A method according to claim 1, wherein said electrical or electronic signal, is coming from a receiving apparatus, adapted to receive musical or voice audio transmitted in electronic form and to transform it into said received electrical or electronic signal, and wherein the method comprises the further step of generating and diffusing an acoustic signal corresponding to said musical or voice audio, so that said acoustic signal is perceived by the listener at the same time as the application of said one or more modulated tactile stimuli.

9. A method according to claim 1, comprising, before the step of modulating, the additional step of processing said electrical or electronic signal to obtain a driving signal, and wherein the step of modulating comprises modulating said one or more tactile stimuli by means of the driving signal.

10. A method according to claim 9, wherein said step of processing comprises frequency-filtering the electric or electronic signal,
and/or translating the frequency spectrum of the electric or electronic signal around a desired central frequency,
and/or varying or distorting the frequency spectrum according to a predefined law,
by operating in the frequency and/or time domain.

11. A method according to claim 1, wherein said musical or voice or sound audio comprises human voice, articulated in words or song.

12. A method according to claim 1, wherein said musical or voice or sound audio comprises a sound and/or musical composition and/or a song, and said tactile stimuli comprising vibrations of mechanical or acoustic type.

\* \* \* \* \*